(12) United States Patent
Kong

(10) Patent No.: US 9,573,545 B1
(45) Date of Patent: Feb. 21, 2017

(54) INTEGRATED CRASHPAD AND MANUFACTURING METHOD OF THE SAME

(71) Applicant: Hyundai Motor Company, Seoul (KR)

(72) Inventor: Byung Seok Kong, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/226,171

(22) Filed: Aug. 2, 2016

(30) Foreign Application Priority Data

Mar. 14, 2016 (KR) ........................ 10-2016-0030234

(51) Int. Cl.
*B60R 21/215* (2011.01)
*B60R 21/04* (2006.01)

(52) U.S. Cl.
CPC ............. *B60R 21/04* (2013.01); *B60R 21/215* (2013.01)

(58) Field of Classification Search
CPC .............................. B60R 21/04; B60R 21/215
USPC ....................................................... 280/728.3
See application file for complete search history.

(56) References Cited

U.S. PATENT DOCUMENTS

| | | | | |
|---|---|---|---|---|
| 6,170,859 B1 * | 1/2001 | Kausch | ................. | B60R 21/215 280/728.3 |
| 6,443,483 B2 * | 9/2002 | Ellerbrok | ............ | B60R 21/2155 280/728.3 |
| 7,249,782 B2 * | 7/2007 | Weissert | ............... | B60R 21/216 280/728.3 |
| 7,594,674 B1 * | 9/2009 | Biondo | ............... | B60R 21/2165 280/728.3 |
| 8,191,924 B2 * | 6/2012 | Schupbach | ......... | B60R 21/2165 280/728.3 |
| 8,408,588 B2 * | 4/2013 | Wittkamp | ........... | B60R 21/2165 280/728.3 |
| 8,424,905 B2 * | 4/2013 | Brunet | .................. | B60R 21/206 280/728.3 |
| 8,807,592 B2 * | 8/2014 | Bieck | .................... | B60R 21/215 280/728.3 |
| 9,010,801 B2 * | 4/2015 | Baudart | ............. | B60R 13/0256 280/728.3 |

(Continued)

FOREIGN PATENT DOCUMENTS

KR 10-1997-0021420 5/1998
KR 10-2010-0064021 6/2010

(Continued)

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

An integrated crashpad is provided. The integrate crashpad includes an integrally formed crashpad base that is indented on a passenger-facing front surface thereof toward the front of a vehicle, an accommodation space with a front airbag that is disposed therein, and a front airbag door that is integrally formed with the crashpad base. The front airbag door opens based on a first bent portion that is indented on the front surface of the crashpad base as a score line and is coupled to a second bent portion on the front surface to define the accommodation space. A reinforcement sheet is inserted into the crashpad base and the front airbag door to connect the crashpad base and the front airbag door based on the score line. The reinforcement sheet prevents separation of the front airbag door from the crashpad base along the score line when the front airbag is inflated.

10 Claims, 6 Drawing Sheets

(56) References Cited

U.S. PATENT DOCUMENTS

| | | | | |
|---|---|---|---|---|
| 2007/0052211 A1* | 3/2007 | Hayashi | ............. | B60R 21/2165 |
| | | | | 280/728.3 |
| 2011/0084469 A1* | 4/2011 | Wittkamp | ........... | B60R 21/2165 |
| | | | | 280/728.3 |
| 2011/0278827 A1* | 11/2011 | Laboeck | ............. | B60R 21/2165 |
| | | | | 280/743.2 |
| 2012/0126514 A1* | 5/2012 | Choi | .................... | B60R 21/215 |
| | | | | 280/728.3 |

FOREIGN PATENT DOCUMENTS

| KR | 10-2011-0009316 | 1/2011 |
|---|---|---|
| KR | 10-1071731 | 10/2011 |

\* cited by examiner

INTEGRATED CRASHPAD AND MANUFACTURING METHOD OF THE SAME

CROSS REFERENCE TO RELATED APPLICATION

The present application claims priority to Korean Patent Application No. 10-2016-0030234, filed Mar. 14, 2016, the entire contents of which is incorporated herein for all purposes by this reference.

BACKGROUND

Field of the Invention The present invention relates to an integrated crashpad and more particularly, to an integrated crashpad that has an accommodation space with a front airbag disposed therein. In particular, a crashpad base and a front airbag door are integrally formed and a reinforcement sheet is disposed in a score line portion of the front airbag door to prevent separation of the front airbag door from the crashpad base along a score line when the front airbag is inflated.

Description of the Related Art

Generally, as shown in FIG. 1, an existing crashpad includes an integrated front airbag door chute 1; a front airbag housing formed from a steel material 2 and a crashpad core 3 with each component being separated from each other. In particular, when a front airbag 4 is inflated, a backward movement force damages a connected portion that connects the front airbag housing 2 and the integrated front airbag door chute 1 to each other and the front airbag 4 is damaged.

Furthermore, when a gap is formed in a connected portion and resin foams due to a lack of connection rigidity, deformation is caused by foaming pressure or resin leaks to the gap. Accordingly, the inflation performance of the front airbag 4 decreases or a manufacturing defect occurs.

The above information disclosed in this section is merely to aid in the understanding of the background of the present invention, and therefore it may contain information that does not form the prior art that is already known in this country to a person of ordinary skill in the art.

SUMMARY

The present invention provides an integrated crashpad that has an accommodation space with a front airbag disposed therein and a crashpad base and a front airbag door are formed integrally. A reinforcement sheet is disposed in a score line portion of the front airbag door to prevent the front airbag door from separation from the crashpad base along a score line when the front airbag is inflated.

According to one aspect of the present invention, an integrated crashpad may include an integrally formed crashpad base indented on a passenger-facing front surface thereof toward a front portion of a vehicle, the crashpad base may include an accommodation space with a front airbag disposed therein and a front airbag door integrally formed with the crashpad base. The front airbag door may be configured to open based on a first bent portion indented on the front surface of the crashpad base as a score line and may be coupled to a second bent portion on the front surface of the crashpad base to define the accommodation space. A reinforcement sheet may be inserted into the crashpad base and the front airbag door to connect the crashpad base and the front airbag door based on the score line. The reinforcement sheet may be configured to prevent separation of the front airbag door from the crashpad base along the score line when the front airbag is inflated.

With reference to a section perpendicular to vertical directions of the first bent portion and the front airbag door, a first line may extend along the front surface of the crashpad base, a second line may extend along an indented direction of the crashpad base, and a third line may extend along the front airbag door to meet or join at the score line and form a triple junction. The reinforcement sheet may be inserted into the crashpad base and the front airbag door and may cross the reinforcement sheet from the second line to the third line via the triple junction.

The crashpad base and the front airbag door may be formed as a plane when the front airbag door is closed. The front surface of the crashpad base may gradually decline to decrease the thickness of the crashpad base as the proximity of crashpad base to the score line increases and an exterior surface of the front airbag door may gradually decline to decrease the thickness of the front airbag door as the proximity of front airbag door to the score line increases. The reinforcement sheet may include a reinforced fiber layer formed in a weave pattern that is impregnated with resin. A resin layer may cover top and bottom surfaces of the reinforced fiber layer. A plurality of protrusions formed on a surface of the resin layer may be configured to prevent the reinforcement sheet from moving during insert injection molding of the crashpad base, the front airbag door, and the reinforcement sheet. The resin utilized for the reinforced fiber layer and the resin layer may be formed from thermoplastic olefin resin.

A method of manufacturing an integrated crashpad, in which a crashpad base includes accommodation space with a front airbag disposed therein and a front airbag door are formed integrally using a mold with a slide core may include disposing a reinforced fiber within the interior of the mold and disposing a reinforcement sheet in a connected portion that connects the crashpad base and the front airbag door to each other and configured to open the front airbag door based on a score line on the crashpad base. Further, the method of manufacturing may include assembling the mold to configure a slide core to move to press a portion in which the reinforcement sheet is disposed and injecting resin into the mold and curing the injected resin and separating the cured resin from the mold.

Prior to the disposition process, the method may further include a preparation process of forming a plurality of vacuum apertures within the interior of the mold and preparing the reinforcement sheet having a plurality of first protrusions on a first surface thereof to insert the plurality of first protrusions into the plurality of vacuum apertures when the reinforcement sheet is disposed within the mold. A plurality of fixing grooves may be formed within the slide core. A plurality of second protrusions may be formed on a second surface of the reinforcement sheet and may be inserted into the plurality of fixing grooves when the slide core is pressed. The reinforcement sheet may be disposed to connect an indented portion of the crashpad base and the front airbag door via the score line.

According to the integrated crashpad, the accommodation space the front airbag disposed therein, the crashpad base, and the front airbag door may be formed integrally. Thus, when the front airbag is inflated, damage to the front airbag may be prevented, thereby improving inflation performance of the front airbag. Furthermore, the front airbag door may be prevented from separating from the crashpad base along the score line when the front airbag is inflated. In particular, the score line portion may have sufficient tensile strength to endure an inertia force generated by opening of the front airbag door by disposing the reinforcement sheet in the score line portion of the front airbag door.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
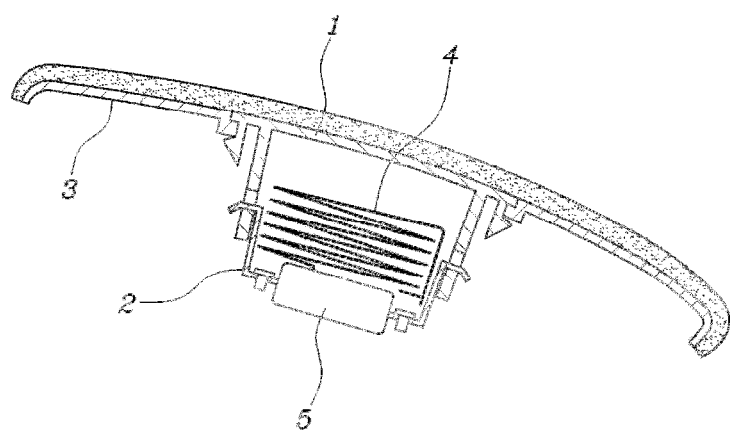
FIG. 1 is an exemplary view illustrating a crashpad according to the related art.

Hereinbelow, exemplary embodiments of the present invention will be described in detail with reference to the accompanying drawings. Throughout the drawings, the same reference numerals will refer to the same or like parts.

The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles hydrogen-powered vehicles and other alternative fuel vehicles (e.g. fuels derived from resources other than petroleum).

Figure 2:
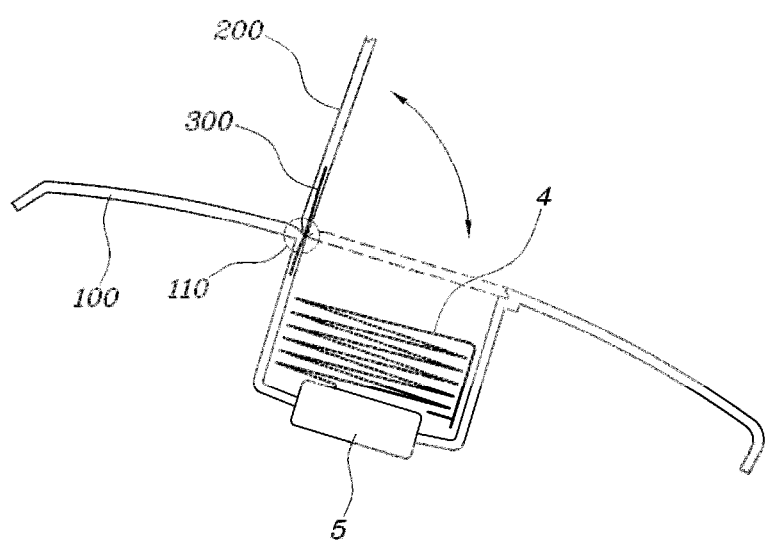
FIG. 2 is an exemplary view illustrating an integrated crashpad according to an exemplary embodiment of the present invention.

An integrated crashpad according to the present invention, as shown in FIG. 2, may include an integrally formed crashpad base 100 indented on a passenger-facing front surface thereof toward the front portion of a vehicle. The crashpad base 100 may include an accommodation space that has a front airbag 4 disposed therein, a front airbag door 200 may be integrally formed with the crashpad base 100, the front airbag door may be configured to open based on a first bent portion indented on the front surface of the crashpad base 100 as a score line 110 and may be coupled to a second bent portion on the front surface of the crashpad base to define the accommodation space. Further, a reinforcement sheet 300 may be inserted into the crashpad base 100 and the front airbag door 200 to connect the crashpad base 100 and the front airbag door 200 based on the score line 110. The reinforcement sheet may prevent separation of the front airbag door 200 from the crashpad base 100 along the score line 110 when the front airbag 4 is inflated.

The accommodation space that accommodates a passenger airbag therein may be formed in the crashpad base 100 to position the crashpad base 100 as an indention on the front surface of the crashpad base toward a front portion of a vehicle. The front airbag 4 and an inflator 5 configured to inflate the front airbag 4 during a vehicle collision may be installed in the accommodation space. The crashpad base 100 may be formed from a composite material comprising glass fiber and polypropylene resin, but is not limited thereto.

Furthermore, the front airbag door 200 may be formed integrally with the crashpad base 100 and may be formed from the same material as the crashpad base 100. A first end of the front airbag door 200 may be connected to the first bent portion indented on the front surface of the crashpad base 100. Accordingly, the front airbag door 200 may be configured to open based on the first bent portion of the score line 110. Further, a second end of the front airbag door 200 may be coupled to the second bent portion of the crashpad base 100 and the accommodation space may be closed in this configuration. The front airbag door 200 may be configured to open toward an exterior direction of the accommodation space. Further, when the front airbag door 200 is closed, the second end of the front airbag door 200 may be coupled to the second bent portion. Accordingly, the front airbag door 200 and the crashpad base 100 may form the front surface. Unlike the related art, components for the front surface, the accommodation space, and the front airbag door are not formed, separately, but may be integrally formed.

When the front airbag 4 is inflated, a score line portion may have sufficient tensile strength to endure an inertia force generated by opening of the front airbag door 200. In particular, the reinforcement sheet 300 inserted into the crashpad base 100 and the front airbag door 200 defined by the score line 110 may provide the necessary tensile strength. Accordingly, a carbon fiber mat may be utilized as the reinforcement sheet 300. The carbon fiber mat may comprise a textile formed from carbon fiber and thermoplastic olefin (TPO) resin. When the crashpad base 100 and the front airbag door 200 are formed, the reinforcement sheet 300 may be inserted into the crashpad base 100 and the front airbag door 200 using insert molding.

The integrated crashpad according to the present invention may be manufactured to integrally form the crashpad base 100 and the front airbag door 200 and the reinforcement sheet 300 that reinforces the score line 110 of the front airbag door 200 may be inserted into the crashpad base 100 and the front airbag door 200. Accordingly, unlike in the related art, damage to the front airbag 4 may be prevented and may improve the inflation performance of the front airbag 4. Furthermore, in a manufacturing process, since resin does not leak between the crashpad base 100 and the front airbag door 200, defects in manufacturing and appearance may be prevented.

Figure 3:
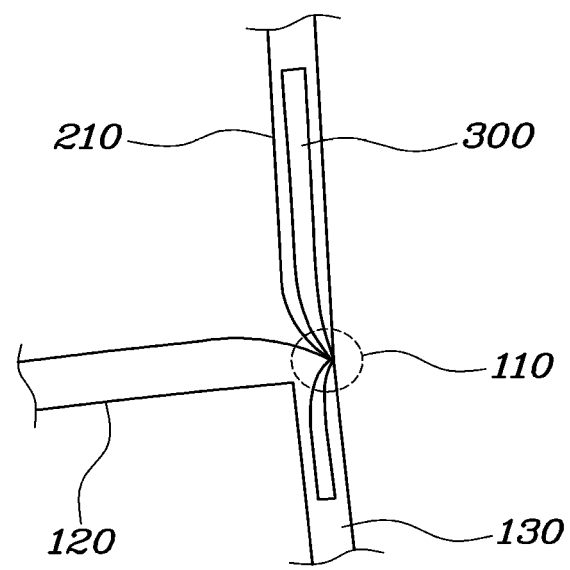
FIG. 3 is an exemplary view illustrating a score line according to an exemplary embodiment of the present invention.

In the integrated crashpad according to the present invention, a structure with the reinforcement sheet 300 inserted into the crashpad base 100 and the front airbag door 200 is described in further detail. As shown in FIG. 3, a section perpendicular to vertical directions of the first bent portion and the front airbag door 200 may include a first line 120 that extends along the front surface of the crashpad base 100, a second line 130 that extends along an indented direction of the crashpad base 100 and a third line 210 that extends along the front airbag door 200 that meet at the score line 110 and form a triple junction. The reinforcement sheet 300 may be inserted into the crashpad base 100 and the front airbag door 200 to enable the reinforcement sheet to cross from the second line 130 to the third line 210 via the triple junction.

When the front airbag 4 is inflated, the front airbag door 200 may be configured to open toward an exterior direction of the accommodation space. In particular, the reinforcement sheet 300 may be inserted into the crashpad base 100 and the front airbag door 200, which corresponds to the second line 130 and the third line 210 based on the triple junction respectively. Namely, the score line portion may have sufficient tensile strength to endure an inertia force generated by opening of the front airbag door 200. Moreover, in preparation for opening of the front airbag door 200 based on inflation of the front airbag 4, the front surface of the crashpad base 100 may gradually decline to decrease the thickness of the crashpad base as the proximity of the crashpad base becomes closer to the score line 100 decreases and an exterior surface of the front airbag door 200 may gradually decline to decrease the thickness of the front airbag door as the proximity of the front airbag door becomes closer to the score line 110 increases.

As shown in FIG. 3, the thicknesses of the crashpad base 100 and the front airbag door 200 may gradually decrease as the proximity crashpad base 100 and the front airbag door 200 to the score line 110 decrease to prevent an interference of the crashpad base 100 and the front airbag door 200 with each other at the score line 110 when the front airbag door 200 is opened. In particular, the crashpad base 100 and the front airbag door 200 may be prevented from being damaged. In the integrated crashpad according to the present invention, the reinforcement sheet 300 may include a reinforced fiber layer formed in a weave pattern may be impregnated with resin and a resin layer that covers the top and bottom surfaces of the reinforced fiber layer.

As described above, the reinforced fiber layer may be formed in a weave pattern that formed of carbon fiber, but not limited thereto. The top and bottom surfaces of the reinforced fiber layer may be covered with the resin layer when the reinforcement sheet 300 is viewed in an exemplary side sectional view and the reinforced fiber layer may be impregnated with resin. The resin of the resin layer covering the reinforced fiber layer may be formed from thermoplastic olefin (TPO) resin. The thermoplastic olefin (TPO) resin, i.e., thermoplastic resin, has high ductility and excellent environment resistant properties. For example, the thermoplastic olefin resin may be effective to reinforce the score line 110 due to the high ductility thereof, when the front airbag door 200 opens.

Figure 4:
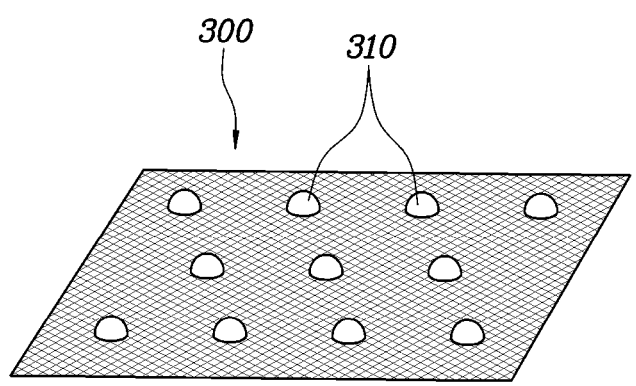
FIG. 4 is an exemplary view illustrating a reinforcement sheet according to an exemplary embodiment of the present invention.

Furthermore, as shown in FIG. 4, a plurality of protrusions 310 may be formed on a surface of the resin layer and may be configured to prevent movement of the reinforcement sheet 300 a process of insert injection molding of the crashpad base 100, the front airbag door 200, and the reinforcement sheet 300.

Figure 5:
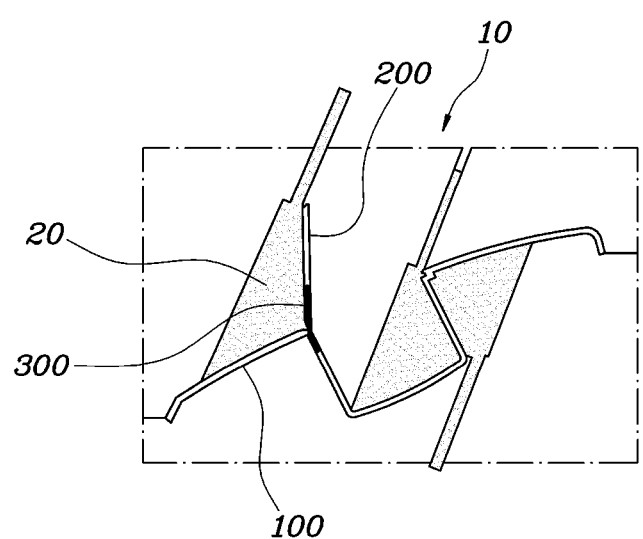
FIG. 5 is an exemplary view illustrating a mold and a slide core according to an exemplary embodiment of the present invention.

More specifically, as shown in FIG. 5, a method of manufacturing an integrated crashpad, in which a crashpad base 100 having an accommodation space with a front airbag 4 disposed therein and a front airbag door 200 are formed integrally using a mold 10 with a slide core 20 may include a disposition step of disposing reinforced fiber within the interior of the mold 10 and disposing a reinforcement sheet 300 in a connected portion when the crashpad base 100 and the front airbag door 200 are connected to each other and configured to open the front airbag door 200 based on a score line 110 on the crashpad base 100. Further, the manufacturing method may include assembling the mold 10 to press a portion in which the reinforcement sheet 300 is disposed by movement of the slide core 20, injecting resin into the mold 10 and curing the injected resin and separating the cured resin from the mold 10.

Figure 6:
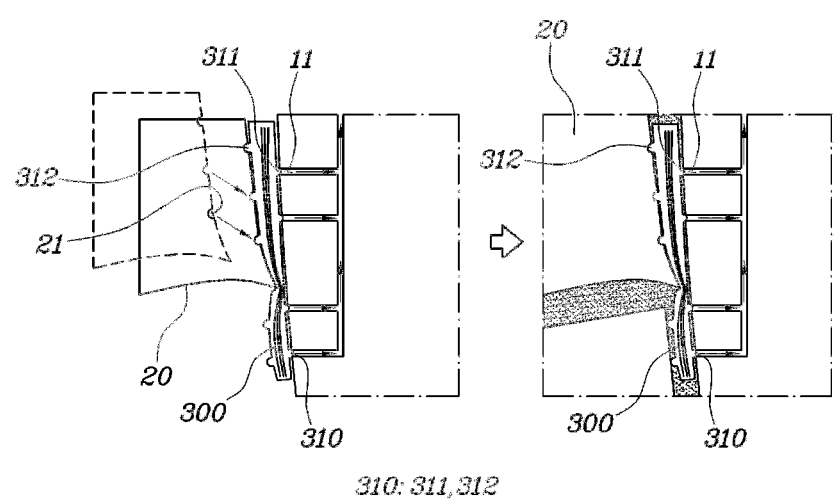
FIG. 6 is an exemplary view illustrating a manufacturing process of the integrated crashpad according to an exemplary embodiment of the present invention.

The reinforced fiber may be disposed within the interior of the mold 10 to integrally form the crashpad base 100 having the accommodation space and the front airbag door 200. Further, the reinforcement sheet 300 may be disposed within the connected portion that connects the crashpad base 100 and the front airbag door 200 to each other and the front airbag door 200 may be configured to open based on the score line 110. In particular, the front airbag door 200 may be connected to the crashpad base 100 to prevent separation of the front airbag door 200 from the crashpad base 100 along the score line 110 when the front airbag 4 is inflated. Thereafter, the mold 10 may be closed and pressed to form the reinforced fiber and the reinforcement sheet 300 in a shape of the crashpad base. In other words, as shown in FIG. 6, the mold 10 may be assembled and configured to press a portion in which the reinforcement sheet 300 is disposed by moving the slide core 20.

In order to fix the reinforcement sheet 300 to an initial position the method may include forming a plurality of vacuum apertures 11 within the interior of the mold 10 and preparing the reinforcement sheet 300 having a plurality of first protrusions 311 on a first surface thereof. Accordingly, the plurality of first protrusions 311 may be inserted into the plurality of vacuum apertures 11 when the reinforcement sheet 300 is disposed in the mold 10. Further, a plurality of fixing grooves 21 may be formed within the slide core 20. A plumality of second protrusions 312 may be formed on a second surface of the reinforcement sheet 300 and inserted into the plurality of fixing grooves 21 when the slide core 20 is pressed.

The reinforcement sheet 300 may allow the score line portion to have tensile strength to withstand an inertia force generated by opening of the front airbag door 200 that disposes the reinforcement sheet 300 based on the score line 110. Accordingly, the reinforcement sheet 300 may maintain the initial position throughout the manufacturing process. For example, the reinforcement sheet 300 to be moved. The initial position of the reinforcement sheet 300 may be maintained during the insert molding and the plurality of first protrusions 311 formed on the first surface of the reinforcement sheet 300 may be inserted into the plurality of vacuum apertures 11 disposed within the interior of the mold 10. Furthermore, the reinforcement sheet 300 may not be moved by a flow of resin during the insert molding in such a way that the plurality of fixing grooves 21 may be formed in the slide core and the plurality of second protrusions 312 formed on the second surface of the reinforcement sheet 300 may be inserted into the plurality of fixing grooves 21.

Thereafter, resin may be injected and moved between the reinforced fiber and the mold 10. The reinforced fiber may be impregnated with the resin. Further, manufacture of the integrated crashpad may be completed with the injected resin completely cured and the integrated crashpad may be separated from the mold 10. Meanwhile, the reinforcement sheet 300 may be disposed to connect the reinforcement sheet 300 with an indented portion of the crashpad base 100 and the front airbag door 200 via the score line 110. As described above, when the reinforcement sheet 300 is disposed in a state of reinforcing both the indented portion and the front airbag door 200, the front airbag door 200 may be configured to open toward an external direction of the accommodation space when the front airbag 4 is inflated. Thus, the score line portion may have a sufficient tensile strength to withstand an inertia force generated by opening of the front airbag door 200.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An integrated crashpad, comprising:
   an integrally formed crashpad base indented on a passenger-facing front surface thereof toward a front portion of a vehicle, wherein the crashpad base is configured to have an accommodation space with a front airbag disposed therein;
   a front airbag door integrally formed with the crashpad base, configured to open based on a first bent portion indented on the front surface of the crashpad base as a score line and coupled to a second bent portion on the front surface of the crashpad base to define the accommodation space; and
   a reinforcement sheet configured to be inserted into the crashpad base and the front airbag door to connect the crashpad base and the front airbag door based on the score line,
   wherein the reinforcement sheet is configured to prevent the front airbag door from separating from the crashpad base along the score line when the front airbag is inflated.

2. The integrated crashpad of claim 1, further comprising:
   a section perpendicular to vertical directions of the first bent portion and the front airbag door having a first line that extends along the front surface of the crashpad base, a second line that extends along an indented direction of the crashpad base, and a third line that extends along the front airbag door join at the score line and form a triple junction,
   wherein the reinforcement sheet crosses from the second line to the third line via the triple junction and the reinforcement sheet is configured to be inserted into the crashpad base and the front airbag door.

3. The integrated crashpad of claim 1, wherein the crashpad base and the front airbag door are formed as a plane when the front airbag door is closed.

4. The integrated crashpad of claim 1, wherein the front surface of the crashpad base gradually declines to decrease a thickness of the crashpad base when the crashpad base proximity to the score line increases and an exterior surface of the front airbag door declines to decrease a thickness of the front airbag door as proximity of the front airbag door to the score line increases.

5. The integrated crashpad of claim 1, wherein the reinforcement sheet includes:
   a reinforced fiber layer formed in a weave pattern that is impregnated with resin;
   a resin layer disposed over top and bottom surfaces of the reinforced fiber layer; and
   a plurality of protrusions formed on a surface of the resin layer to configured to enable the reinforcement sheet to maintain a fixed position during a process of insert injection molding of the crashpad base, the front airbag door, and the reinforcement sheet.

6. The integrated crashpad of claim 5, wherein resin utilized for the reinforced fiber layer and the resin layer are made of thermoplastic olefin resin.

7. A method of manufacturing an integrated crashpad, having a crashpad base with an accommodation space for a front airbag disposed therein and a front airbag door are integrally formed, using a mold with a slide core, the method comprising:
   disposing reinforced fiber within the interior of the mold;
   disposing a reinforcement sheet within a connected portion that connects the crashpad base and the front airbag door to each other and configured to open that the front airbag door based on a score line disposed on the crashpad base;
   assembling the mold that is configured to press a portion that the reinforcement sheet is disposed in by moving the slide core;
   injecting resin into the mold; curing the injected resin; and separating the cured resin from the mold.

8. The method of claim 7, the method further comprises:
   forming a plurality of vacuum apertures within the interior of the mold: and
   preparing the reinforcement sheet having a plurality of first protrusions on a first surface thereof and inserting the plurality of first protrusions into the plurality of vacuum apertures when the reinforcement sheet is disposed within the mold.

9. The method of claim 8, wherein a plurality of fixing grooves are formed within the slide core and a plurality of second protrusions are formed on a second surface of the reinforcement sheet and configured to press the slide core to insert the plurality of second protrusions on the second surface of the reinforcement sheet into the plurality of fixing grooves.

10. The method of claim 7, wherein the reinforcement sheet is disposed to connect an indented portion of the crashpad base and the front airbag door via the score line.

* * * * *